Feb. 16, 1926.

C. H. L. WILKINS 1,573,107

CAN SIDE SEAMS SOLDERING MACHINE

Filed Feb. 26, 1924

INVENTOR:
CHARLES HORACE LEONARD WILKINS
BY Francis E. Boyce
ATTORNEY

Patented Feb. 16, 1926.

1,573,107

UNITED STATES PATENT OFFICE.

CHARLES HORACE LEONARD WILKINS, OF CROWS NEST, NEAR SYDNEY, NEW SOUTH WALES, AUSTRALIA.

CAN-SIDE-SEAMS-SOLDERING MACHINE.

Application filed February 26, 1924. Serial No. 695,157.

*To all whom it may concern:*

Be it known that I, CHARLES HORACE LEONARD WILKINS, a subject of the King of Great Britain, residing at "Eden", Crows Nest, near Sydney, in the State of New South Wales and Commonwealth of Australia, have invented a new and useful Improved Can-Side-Seams-Soldering Machine, of which the following is a specification.

This invention has been specially devised to provide a machine of cheap and simple construction for soldering the side or longitudinal seams of cans and particularly the side-seams of cans such as kerosene, petrol and like tins quickly, efficiently and economically.

This improved can side-seam soldering machine has an open bed or contour framing along which cans to be soldered are adapted to be drawn by endless travelling chains. Along a side of the framing is arranged one or more soldering rollers with devices for revolving same and with solder troughs for the rollers to dip into and apparatus for heating the solder. Flux pads as revolvable discs preferably of resilient material are positioned preceding the said soldering rollers and have revolvable brushes adapted to contact with same and to dip into fluxing troughs nearby.

Figure 1:
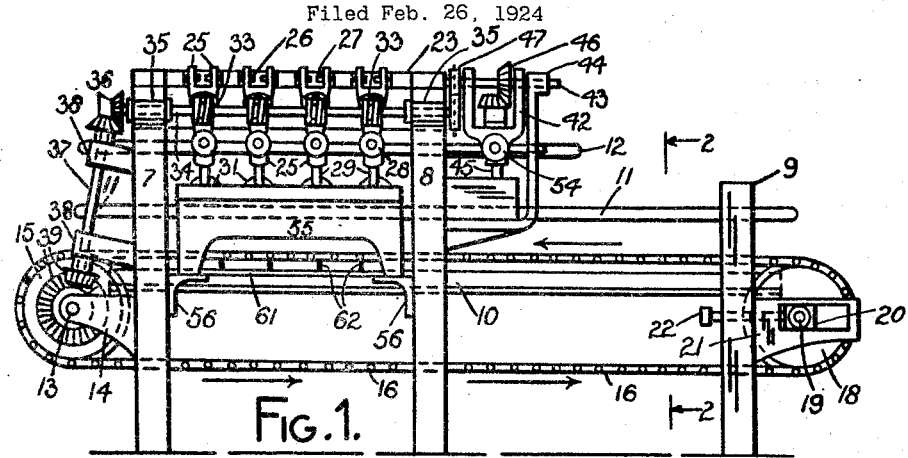
Figures 2, 3:
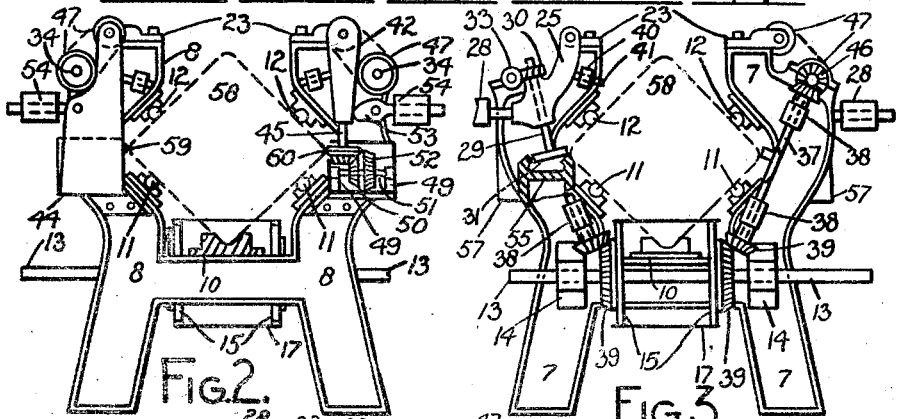
Figure 4:
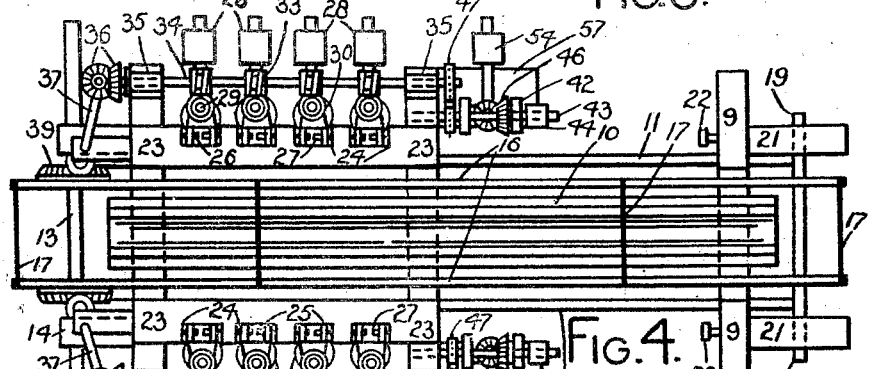
Figures 5, 6:
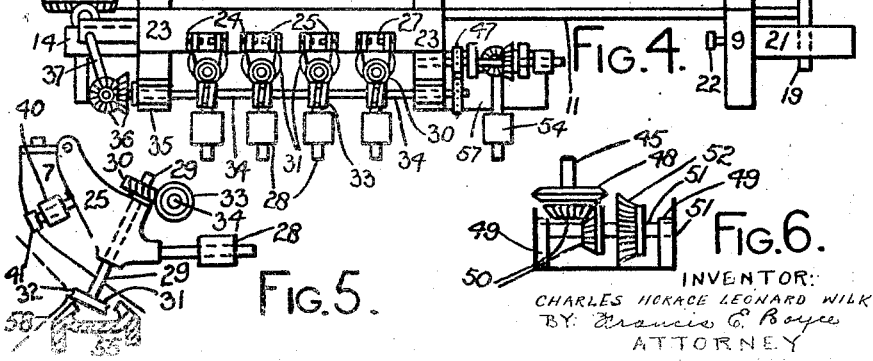

But in order that this invention may be more readily understood and carried into practical effect the present preferred construction of this improved can side-seam soldering machine will now be described with reference to the drawings accompanying and forming part of this complete specification, in which Fig. 1 is a side elevation, Fig. 2 a sectional elevation on line 2—2 Fig. 1. Fig. 3 is a discharge end elevation partly in section and Fig. 4 a plan of such a soldering machine while Figs. 5 and 6 are enlarged in section and Fig. 4 a plan of such a solder-rollers and its parts and of one of the fluxing elements.

The bed or V-frame has A-frames 7, 8 and 9 supporting a base and sides the former having a channelled track bar 10 altogether of contour approaching that of the cans and constituting a contour framing on the sides of which are track bars 11 and steadying guide bars 12. Mounted in bearings 14 on the discharge or rear frame 7 is a shaft 13 having thereon sprocket wheels 15 engaging two endless chains 16 which have connecting catch or drag bars 17 spaced apart suitably according to the length of the cans, and said chains 16 and bars 17 travel the length of the machine over and under the track bar 10 and pass around idler sprocket wheels 18 on a shaft 19 in adjustable bearings 20 in brackets 21 fast to frame 9 and having screws 22 to adjust the tension on the chains 16.

In the particular machine shown it is provided that the soldering of two seams of a can may take place at the same time and there is a duplication of identical parts which occupy respectively each side of the machine and for the sake of simplicity therefore one side only will be described it being understood that such described parts may be duplicated or even pluralized if necessary on or in the one contour framing. Positioned between frames 7 and 8 are longitudinal bearers 23 having one or more slots or bays 24 in each of which is a bracket 25 removably pivoted therein by easily removable pins 26 and 27. A bar 40 fast to the frames 7 and 8 has a set screw stop 41 to limit the inward swing of each bracket 25. Each bracket 25 has a slidably adjustable counterbalance weight 28 and a spindle 29 having a worm wheel 30 and soldering roller 31 the periphery 32 of which latter is slightly concaved or so shaped relatively to the grooves or other contour of the seams to be soldered that it will hold between one of its edges and the seam a quantity of fluid solder. Each worm wheel 30 meshes with a worm 33 on a shaft 34 mounted in bearings 35 on the bearers 23 and said shaft 34 has bevel gearing 36 to an intermediate shaft 37 in bearings 38 on the frame 7 which said shaft 37 has gearing 39 to the before mentioned shaft 13.

On a side shaft 43 in bearings in or on bracket 44 forwardly of the described soldering rollers is a hanging bracket 42 carrying spindle 45 with gearing 46 to said side shaft 43 which in turn has gearing 47 to the shaft 34 and said spindle has a resiliently faced pad or disc or roller 48 of rubber or like material preferably pointed and also has bevel gearing 50 to shaft 51 in bearings 49 on which is a circular fluxing brush 52 adapted to contact with the point or edge of the pad 48. A balance shaft 53 pivoted to the frame 8 has an adjustable counterbalance weight 54 and is adapted to abut the bracket 42 and resiliently hold it to its work and the pointed pad 48 on or against the seam of a passing can. An adjustable stop 63 is provided to limit the inward swing of the bracket 42. A trough 55 on brackets 56 fast to the frames 7 and 8 is positioned so that the lower edge of the solder roller 31 dips into same and it has gas burners 61 on shelf 62 or other heating devices may be utilized. Flux trough 57 is fast to the framing in juxtaposition to the fluxing brush 52.

In operation power being applied to the driving shaft 13 the endless chains 16 are caused to travel and the soldering rollers 31 and the fluxing disc 48 and brush 52 are revolved. Solder is supplied to the troughs 55 and kept at the requisite temperature by the burners 61. The rollers 31 revolving partly in the troughs 55 are sufficiently heated thereby to pick up solder and to transfer it to where required. The brush 52 dipping in the flux trough 57 supplies the pointed pad or disc 48 with a film of flux and which said pad transfers to the can seam and owing to its resilient facing in or on to the surface of any slight irregularities. A tin 58 whose seams are to be soldered is placed on the machine with one corner resting in channelled track bar 10 and the seams naturally disposed at points 59 and 60 and the tin sides contacting with the tracks 11 and guides 12 which hold it in position and steady as owing to the movement of a drag bar 17 abutting its end it passes along the channelled track bar 10 through the machine with its seams presented first to the fluxing pads 48 and then to the soldering rollers 31 whose shapes insure that the flux is deposited only where required and that sufficient solder is provided to seal the seam.

Any soldering roller and its parts may be removed as for cleaning without stoppage of the machine by removing the centre pin 27 and removing the bracket 25.

It is to be clearly understood that the carrying into practical effect of this invention is not confined to the precise constructions of the various elements or mechanisms described and illustrated so long as the nature and mechanical attributes thereof are retained and while the scope of the invention is maintained for many variations of the construction of the respective functional parts or integers will suggest themselves to those skilled in the art to which this invention appertains.

What I claim as my invention and desire to secure by Letters Patent is:—

1. A soldering machine, comprising, in combination, a frame provided with a track bar adapted to support a can longitudinally thereof, means for engaging the can at different points on its outer periphery thereby to retain and guide said can on said track bar, a traveling member adapted to move the can continuously in one direction between said engaging means, brackets pivotally mounted on the frame at opposite sides thereof and adapted to swing toward said frame, a counterbalancing weight carried by each of said brackets and adapted to urge the same toward the frame, a soldering roller mounted for rotation in each bracket and disposed in position to contact with the can along a line parallel with its longitudinal axis, means for operating said traveling member, and means for transmitting rotary motion from said operating means to said soldering rollers.

2. A soldering machine, comprising, in combination, a frame provided with a track bar adapted to support a can longitudinally thereof, means for engaging the can at different points on its outer periphery thereby to retain and guide the can on said track bar, a traveling member adapted to move the can continuously in one direction between said engaging means, soldering rollers disposed along said frame in position to contact with the surface of the can along a line parallel with its longitudinal axis, the periphery of each of said rollers being so shaped relatively to the contour of the seams of the can that a quantity of fluid solder will be held between one edge of the roller and the seam, and means for operating said traveling member.

3. A soldering machine, comprising, in combination, a frame provided with a track bar adapted to support a can longitudinally thereof, means for engaging the can at different points on its outer periphery thereby to retain and guide the can on said track bar, a traveling member adapted to move the can continuously in one direction between said engaging means, rotatable soldering elements disposed along said frame in position to contact with the surface of the can tangentially thereof along a line parallel with its longitudinal axis, the periphery of each of said rollers being concaved whereby a quantity of fluid solder will be held between one edge of the roller and the seam of the can, means for operating said traveling member, and means for transmitting rotary motion from said operating means to said soldering elements.

4. A soldering machine, comprising, in combination, a frame provided with a track bar adapted to support a can longitudinally thereof, means for engaging the can at different points on its outer periphery thereby to retain and guide the can on said track bar, a traveling member adapted to move the can continuously in one direction between said engaging means, pivotally mounted bearings, rotatable soldering elements mounted in the bearings disposed along said frame and adapted to resiliently engage the surface of the can as it travels through the machine, a counterbalancing weight carried by the bearing of each of said soldering elements for adjusting the pressure of said soldering elements on said can, and means for operating said traveling member.

5. A soldering machine, comprising, in combination, a frame having a track bar adapted to support a can longitudinally thereof and provided with side portions forming a contour similar to that of the can, said side portions having means for engaging the outer surface of the can thereby to guide it on said track bar, a traveling member having means for engaging the can and moving the same continuously in one direction between said side members and bar, pivotally mounted bearings, rotatable soldering elements mounted in said bearings and adapted to resiliently contact with the surface of the can tangentially thereof as it passes through the machine, a counterbalancing weight carried by the bearing of each of said soldering elements for adjusting the pressure of said soldering elements on the can, and means for operating said traveling member.

6. A soldering machine, comprising, in combination, a frame having a track bar adapted to support a can longitudinally thereof and provided with side portions forming a contour similar to that of the can, said side portions having means for engaging the outer surface of the can thereby to guide it on said track bar, a traveling member having means for engaging the can and moving the same continuously in one direction between said side portions and bar, a plurality of levers pivotally mounted on said side portions, each of said levers carrying a rotatable soldering element in position to contact with the surface of the can as it passes through the machine, means for limiting the pivotal movement of said levers thereby to adjust the pressure of said soldering elements on the can, means for operating said traveling member, and means for imparting rotary motion from said operating means to said soldering elements.

7. A soldering machine, comprising, in combination, a frame provided with a track bar adapted to support a can longitudinally thereof, means for engaging the can at different points on its outer periphery thereby to retain and guide the can on said track bar, a traveling member adapted to move the can continuously in one direction between said engaging means, a rotatable fluxing disk carried by said frame and having a resilient edge in position to contact with the surface of the can along a line parallel with its longitudinal axis, a flux trough disposed below said disk, a fluxing brush adapted to take flux from said trough and apply it to said disk, soldering elements disposed along said frame in position to contact with the surface of the can along said line, means for operating said traveling member, and means for transmitting motion from said operating means to said fluxing disk.

8. A soldering machine, comprising, in combination, a frame provided with a track bar adapted to support a can longitudinally thereof, means for engaging the can at different points on its outer periphery thereby to retain and guide the can on said track bar, a traveling member adapted to move the can continuously in one direction between said engaging means, a rotatable fluxing disk carried by said frame in position to contact with the surface of the can along a line parallel with its longitudinal axis, a flux trough disposed below said disk, a fluxing brush adapted to take flux from said trough and apply it to said disk, soldering elements disposed along said frame in position to contact with the surface of the can along said line, means for operating said traveling member, means for transmitting motion from said operating means to said fluxing disk, said fluxing disk and soldering elements being pivoted to swing toward said frame, and a counterbalancing weight for adjusting the pressure of said elements on said can.

In testimony whereof I have signed my name to this specification.

CHARLES HORACE LEONARD WILKINS.